US 6,580,677 B1

(12) United States Patent
Chiba et al.

(10) Patent No.: US 6,580,677 B1
(45) Date of Patent: Jun. 17, 2003

(54) INFORMATION RECORDING MEDIUM AND INFORMATION REPRODUCING APPARATUS

(75) Inventors: Norio Chiba, Chiba (JP); Yasuyuki Mitsuoka, Chiba (JP); Manabu Oumi, Chiba (JP); Nobuyuki Kasama, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/486,751

(22) PCT Filed: Jul. 6, 1999

(86) PCT No.: PCT/JP99/03638
§ 371 (c)(1),
(2), (4) Date: Jun. 16, 2000

(87) PCT Pub. No.: WO00/02200
PCT Pub. Date: Jan. 13, 2000

(30) Foreign Application Priority Data

Jul. 7, 1998 (JP) .......................................... 10-191860

(51) Int. Cl.[7] ................................................ G11B 7/00
(52) U.S. Cl. ................. 369/126; 369/44.26; 369/275.4
(58) Field of Search ........................... 369/275.3, 275.4, 369/44.26, 126, 109, 283, 284, 288; 250/201.5, 216

(56) References Cited

U.S. PATENT DOCUMENTS 5,485,441 A * 1/1996 Maeda ....................... 369/126
5,754,514 A * 5/1998 Guerra ....................... 369/126
6,094,413 A * 7/2000 Guerra ..................... 369/275.4
6,125,095 A * 9/2000 Gemma et al. ............. 369/126
6,370,107 B1 * 4/2002 Hosaka et al. ........... 369/275.3
6,376,827 B1 * 4/2002 Kasama et al. .......... 369/275.3

FOREIGN PATENT DOCUMENTS

JP    04344446 A  * 12/1992

* cited by examiner

Primary Examiner—Thang V. Tran
(74) Attorney, Agent, or Firm—Adams & Wilks

(57) ABSTRACT

There is provided an information recording medium and an information reproducing apparatus capable of carrying out information reproduction and tracking control by utilizing near-field light. A data bit 12 of a convex having a section orthogonal to a tracking direction in a triangular shape is formed on an information recording medium 3 as an information unit, by scattering near-field light formed at a reproducing probe 1 at inclined faces of the data bit 12 with directionalities, fluxes of reflected and scattered light thereby are detected by reproduced light detectors 6 and 7 arranged symmetrically in a left and right direction relative to a central axis of the reproducing probe 1 along the tracking direction, a differential signal between the detected signals is outputted by a difference circuit 20 and an actuator 22 is driven by the differential signal via a tracking signal forming circuit 21 and a position of the reproducing probe 1 is controlled to carry out the tracking control.

15 Claims, 8 Drawing Sheets

INFORMATION RECORDING MEDIUM AND INFORMATION REPRODUCING APPARATUS

CROSS-REFERENCE TO RELATED APPLICATIONS

This application is a U.S. national stage application of copending International Application Ser. No. PCT/JP99/03638, filed on Jul. 6, 1999 claiming a priority date of Jul. 7, 1008, and published in a non-English language.

TECHNICAL FIELD

The present invention relates to an information recording medium which is reproducible by utilizing near-field light and an information reproducing apparatus for reproducing information recorded on the information recording medium at high density, particularly to an information recording medium and an information reproducing apparatus enabling tracking control.

BACKGROUND OF THE INVENTION

Currently, many of information reproducing apparatus carry out reproduction of information with an information medium of a magnetic disk or an optical disk as an object, particularly, CD (Compact Disk) which is one of optical disks is widely used as a medium enabling information recording at high density and mass production at low cost and recording a large capacity of information. A surface of CD is formed with pits each having a size of about a wavelength of laser beam used in reproduction and a depth of about a quarter of the wavelength and reading operation utilizing interference phenomenon of light is carried out.

In reading recorded information from an optical disk represented by CD, generally, there is utilized a lens optical system used in an optical microscope. In this case, when an information recording density is increased by reducing a size of the pit or a track pitch thereof, a deadlock is reached by the problem of diffraction limit of light in which a spot size of laser beam cannot be made equal to or smaller than a half wavelength and an information recording unit cannot be reduced to a size smaller than the wavelength of laser beam.

Further, not only in CD but also in optical recording disks recorded with information by a magneto-optical recording system and a phase change recording system, record and reproduction of information at high density is realized by a very small spot of laser beam and accordingly, the information recording density is restricted by a diameter of the spot provided by converging laser beam.

Hence, in order to break the restriction imposed by the diffraction limit, there is proposed an information reproducing apparatus using an optical head provided with a very small aperture having a diameter equal to or smaller than a wavelength of laser beam utilized for reproduction, for example, a diameter of about $\frac{1}{10}$ of the wavelength and utilizing near-field light (including both of near-field light and far-field light) formed at the very small aperture portion.

Originally, as an apparatus utilizing near-field light, there is provided a near-field microscope using a probe having the above-described very small aperture and the near-field microscope is utilized in observing a very small surface structure of a sample. As one of systems of utilizing near-field light in a near-field microscope, there is provided a system in which a very small aperture of a probe and a surface of a sample are made proximate to each other such that a distance therebetween is equal to about a diameter of the very small aperture of the probe and by introducing propagating light via the probe toward the very small aperture of the probe, near-field light is formed at the very small aperture (illumination mode). In this case, scattered light produced by interaction of the formed near-field light and the surface of the sample, is detected by a scattered light detecting system with an intensity and a phase reflecting a fine structure of the surface of the sample and there is enabled observation having high resolution which cannot be realized by a conventional optical microscope.

Further, as other system of a near-field microscope utilizing near-field light, there is provided a system in which a sample is irradiated with propagating light to thereby localize near-field light on the surface of the sample and a very small aperture of a probe is made proximate to the surface of the sample to a degree of a diameter of the very small aperture of the probe (collection mode). In this case, scattered light produced by interaction of the localized near-field light and the very small aperture of the probe, is guided to a scattered light detecting system via the very small aperture of the probe with an intensity and a phase reflecting a fine structure of the surface of the sample to thereby achieve observation with high resolution.

According to the above-described information reproducing apparatus utilizing near-field light, there are utilized these observation systems in the near-field microscope and by unitizing the near-field light, there is enabled reproduction of information of an information recording medium recorded with information with higher density.

In order to realize reproduction of information recorded on the information recording medium with high density by utilizing the above-described near-field light, there is needed a positioning control technology for moving the very small aperture portion of the probe constituting an optical head to an arbitrary position on the information recording medium with high precision.

In the case of a magnetic disk apparatus, generally, as positioning control, there are adopted a servo face servo system and a sector servo system. The servo face servo system is a method in which one face in a plurality of disk faces is used exclusively for servo, a magnetic head for servo is positioned relative to the servo face and a remaining disk face and a magnetic head are used for data. Further, the sector servo system is a method in which servo information is embedded sporadically on data face and by using the servo information detected discretely, a magnetic head is positioned on data tracks.

However, it is difficult to apply positioning control adopted in these magnetic disk apparatus to positioning control in respect of reproduction of a high density information recording medium by near-field light. For example, according to the above-described servo face servo system, positional accuracies of a head for servo and a head for data are determined by mechanical accuracies and accordingly, there is a case in which a positional shift is produced between the both heads by a difference in temperature distribution and the system is not suitable for being adopted as positioning control in respect of an information recording medium with high density formation.

Further, according to the above-described sector servo system, although there causes no positional shift of heads caused by the difference in the temperature distribution which is problematic in the servo face servo system, at a design stage of a control system, the control system needs to deal with as a discrete value system different from a conventional continuous system and in the case of an information reproducing apparatus utilizing near-field light, there is needed high accuracy positioning with regard to an information recording medium with particularly high density formation and accordingly, it is not preferable to use such a complicated control system.

Meanwhile, according to an optical disk apparatus, as positioning, control methods, particularly as tracking error detecting methods, there are adopted a three beam method, a push-pull method and a prewobbling tracking error detecting method. The three beam method is a method in which beam from a laser diode is divided into a total of three beams of a 0-th order beam (main beam) for record and reproduction and two 1-th order beam (sub beam) for tracking by a diffracting grating, two of the sub beams are slightly shifted from a center of a guide groove provided on an optical disk, fluxes of reflected beam from both of them are received by two light receiving faces of an optical detector and an objective lens is controlled by a differential signal thereof.

Further, the push-pull method is a method in which fluxes of reflected beam of beam irradiated to guide grooves provided on an optical disk are detected by a two split detector and a differential signal provided thereby constitutes a track error signal to thereby control an objective lens. The prewobbling tracking error detecting method is a method in which a set of two long pits (prewobbling marks) A and B are previously arranged on an optical disk to slightly shift from each other in the disk radius direction relative to a center of a track and a change in an amount of fluxes of reflected beam from the pits A and B produced in tracing the center of the track by a light spot, constitutes a track error signal to thereby control an objective lens.

The above-described tracking error detecting methods of the optical disk apparatus are methods in the case in which both of irradiated light to the pit formed on the optical disk and reflected light reflected thereby are dealt with as propagating light (far-field) and a devise is needed when the methods are applied to detection of nonpropagated beam (near-field) such as near-field light and reflected and scattered light thereof. Further, particularly, in a case of an information recording medium enabling reproduction by utilizing near-field light, an information recording unit can be determined not only by recess and projection information as in a pit formed on a conventional optical disk but also a difference in an optical property and accordingly, there is requested an information reproducing apparatus for carrying out optical head positioning control, particularly, tracking in order to reproduce such an information recording medium.

It is an object of the invention to provide an information recording medium and an information reproducing apparatus for realizing reproduction of information having high reliability in respect of an information recording medium recorded with information at high density, particularly, tracking by a simple constitution.

DISCLOSURE OF THE INVENTION

In order to achieve the above-described object, according to a first aspect of the invention, there is provided an information recording medium characterized in that in an information recording medium in which information to be reproduced by a reproducing probe provided with a very small aperture for forming near-field light is formed on a surface of the medium, wherein a unit of the information is constructed by a structure in which inclined faces or curved faces are provided symmetrically in a left and right direction relative to a reading direction and the left and right inclined faces intersect with each other or the left and right curved faces coincide with each other.

According to the first aspect of the invention, the unit of information is constructed by the structure in which the inclined faces or the curved faces are provided symmetrically in the left and right direction with the reading direction as the central axis and accordingly, directionalities can be given to fluxes of reflected light which are reflected when the unit of information is irradiated with fluxes of light and a difference between intensities of the fluxes of reflected light can be unitized as a signal for tracking.

Further, according to a second aspect of the invention, there is provided the information recording medium according to the first aspect, characterized in that the unit of the information is constituted by a section orthogonal to the reading direction in a triangular shape.

According to the second aspect of the invention, the section of the unit of information orthogonal to the reading direction is formed in the triangular shape and accordingly, when the unit of information is irradiated with fluxes of light, the fluxes of light can efficiently be reflected at the inclined faces of the unit of information, further, the directionalities can be given to fluxes of the reflected light and accordingly, the difference between the intensities of the fluxes of reflected light can be utilized as a signal for tracking.

Further, according to a third aspect of the invention, there is provided the information recording medium according to the first aspect, characterized in that the unit of the information is constituted by a section orthogonal to the reading direction in a semicircular shape.

According to the third aspect of the invention, the section of the unit of the information orthogonal to the reading direction is formed in the semicircular shape and accordingly, when the unit of information is irradiated with fluxes of light, the fluxes of light can efficiently be reflected at the curved faces of the unit of the information, further, the directionalities can be given to fluxes of the reflected light and accordingly, the difference between the intensities of the fluxes of reflected light can be utilized as a signal for tracking.

Further, according to a fourth aspect of the invention, there is provided the information recording medium according to the second or the third aspect, characterized in that the unit of the information is formed in a convex relative to a surface of the medium.

According to the fourth aspect of the invention, the unit of information is constructed by a structure in which the unit of the information is provided with the inclined faces or the curved faces symmetrically in the left and right direction with the reading direction as the central axis and is formed in the convex relative to the surface of the information recording medium and accordingly, when the unit of the information is irradiated with fluxes of light which are shifted on the left side, the fluxes of light can be reflected strongly in the left direction and when the unit of the information are irradiated with fluxes of light which are shifted on the right side, the fluxes of light can be reflected strongly in the right direction and accordingly, the difference between the intensities of, fluxes of reflected light can be utilized as a signal for tracking.

Further, according to a fifth aspect of the invention, there is provided the information recording medium according to the second or the third aspect, characterized in that the unit of the information is formed in a concave relative to a surface of the medium.

According to the fifth aspect of the invention, the unit of information is constructed by a structure in which the unit of the information is provided with the inclined faces or the curved faces symmetrically in the left and right direction with the reading direction as the central axis and is formed in the concave relative to the surface of the information recording medium and accordingly, when the unit of information is irradiated with fluxes of light which are shifted to the left, the fluxes of light can be reflected strongly in the right direction and when the unit of information is irradiated with fluxes of light which are shifted to the right, the fluxes of light can be reflected strongly in the left direction and accordingly, the difference between the intensities of fluxes of the reflected light can be utilized as a signal for tracking.

Further, according to a sixth aspect of the invention, there is provided the information recording medium according to any one of the first through the fifth aspects, characterized in that a metal reflecting film is formed on the surface of the medium.

According to the sixth aspect of the invention, the metal reflecting film is formed on the surface of the information recording medium and accordingly, fluxes of light irradiated to the unit of information can efficiently be reflected.

Further, according to a seventh aspect of the invention, there is provided an information reproducing apparatus for reproducing information by a reproducing probe provided with a very small aperture for forming near-field light, characterized in comprising an information recording medium in which a unit of the information is constructed by a structure in which inclined faces or curved faces are provided symmetrically in a left and right direction relative to a reading direction and the left and the right inclined faces intersect with each other or the left and the right curved faces coincide with each other, and a control apparatus for detecting fluxes of reflected and scattered light produced by scattering the near-field light by the unit of the information at at least two positions symmetrical with each other relative to a central axis of the very small aperture along the reading direction and controlling a position of the reproducing probe in accordance with a detected signal.

According to the seventh aspect of the invention, by forming the unit of the information constructed by the structure in which the inclined faces or the curved faces are provided on the left and on the right with the reading direction as the central axis and with the central axis as a top portion, to the information recording medium and making the near-field light formed at the very small aperture of the reproducing probe incident on the information unit, there can be formed fluxes of the reflected and, scattered light provided with the directionalities to the left and to the right, the fluxes of reflected and scattered light are detected at at least two-positions symmetrical with each other relative to the central axis of the very small aperture and the position of the reproducing probe is controlled in accordance with the detected signal and accordingly, tracking control with high accuracy utilizing the near-field light can be carried out.

Further, according to an eighth aspect of the invention, there is provided an information reproducing apparatus for reproducing information by a reproducing probe provided with a very small aperture for forming near-field light, characterized in comprising an information recording medium in which a unit of the information is constructed by a structure in which inclined faces or curved faces are provided symmetrically in a left and right direction relative to a reading direction and the left and the right inclined faces intersect with each other or the left and the right curved faces coincide with each other and a first and a second light detecting means arranged symmetrically with each other in the left and right direction relative to a central axis of the very small aperture along the reading direction for detecting fluxes of reflected and scattered light produced by scattering the near-field light by the unit of the information and outputting detected signals, difference calculating means for calculating a difference between a first detected signal outputted from the first light detecting means and a second detected signal outputted from the second light detecting means and outputting a differential signal, reproducing probe position controlling means for controlling a position of the reproducing probe in accordance with the differential signal, and reproduced signal forming means for calculating to add the first detected signal and the second detected signal and forming a reproduced signal.

According to the eighth aspect of the invention, by forming the unit of the information constructed by the structure in which the inclined faces or the curved faces are provided on the left and on the right with the reading direction as the central axis and with the central axis as a top portion, in the information recording medium and making the near-field light formed at the very small aperture of the reproducing probe incident on the unit of the information, there can be formed fluxes of the reflected and scattered light provided with the directionalities to the left and to the right, the fluxes of reflected and scattered light are detected by the first and the second light detecting means arranged at at least two positions symmetrical with each other relative to the central axis of the very small aperture, the differential signal indicating the difference between the first detected signal detected and outputted by the first light detecting means and the second detected signal detected and outputted by the second light detecting means, is formed by the difference calculating means, positioning control of the reproducing probe in accordance with the differential signal can be carried out by the reproducing probe position controlling means and accordingly, tracking control with high accuracy utilizing the near-field light can be carried out. Further, the reproduced signal can be formed by calculating to add the first detected signal and the second detected signal and accordingly, reproduction of the information can simultaneously be carried out.

Further, according to a ninth aspect of the invention, there is provided the information recording apparatus according to the seventh or the eighth aspect, characterized in that the reproducing probe comprises an optical fiber provided with the very small aperture at a front end thereof.

According to the ninth aspect of the invention, as the reproducing probe, there can be utilized a probe of an optical fiber type used in a conventional near-field microscope and accordingly, accumulated technology of the near-field microscope can effectively be applied to the information reproducing apparatus.

Further, according to a tenth aspect of the invention, there is provided the information reproducing apparatus according to the seventh or the eighth aspect, characterized in that the reproducing probe is a probe of a cantilever type provided with the very small aperture at a projected portion thereof.

According to the tenth aspect of the invention, as the reproducing probe, there can be utilized the probe of the cantilever-type used in the conventional near-field microscope and accordingly, the accumulated technology of the near-field microscope can effectively be applied to the information reproducing apparatus.

According to an eleventh aspect of the invention, there is provided the information recording apparatus according to the seventh or the eighth aspect, characterized in that the reproducing probe is a plane probe comprising a plane substrate formed by being penetrated with a hole in a shape of an inverse cone to constitute the very small aperture by a top portion thereof and the first and the second light detecting means are arranged at the plane substrate.

According to the eleventh aspect of the invention, as the reproducing probe, there can be utilized the plane probe arranged with the first and the second light detecting means and accordingly, a simple apparatus constitution can be realized with no need of adjusting positions of the first and the second light detecting means.

Further, according to a twelfth aspect of the invention, there is provided the information reproducing apparatus according to the eleventh aspect, characterized in that the reproducing probe is the plane probe arranged with a third and a fourth light detecting means for detecting the fluxes of the reflected and scattered light at vicinities of the very small aperture.

According to the twelfth aspect of the invention, as the reproducing probe, there can be utilized the plane probe arranged with the first and the second light detecting means and the third and the fourth light detecting means for detecting fluxes of the reflected and scattered light at vicinities of the very small apertures and accordingly, the reproduced signal having sufficient intensity can be detected by the first and the second light detecting means and the third and the fourth light detecting means.

Further, according to a thirteenth aspect of the invention, there is provided an information reproducing apparatus for forming near-field light at an information recording medium and reproducing information by a reproducing probe for scattering the near-field light, characterized in that fluxes of reflected and scattered light produced by scattering the near-field light produced at a unit of the information formed on the information recording medium by a front end portion of the reproducing probe, are detected at at least two positions symmetrical with each other relative to the front end portion of the reproducing probe and a position of the reproducing probe is controlled in accordance with a detected signal.

According to the thirteenth aspect of the invention, the near-field light produced at the unit of information of the information recording medium is scattered by the reproducing probe, fluxes of the reflected and scattered light are detected at at least two positions symmetrical with each other relative to the front end portion of the reproducing probe, the position of the reproducing probe is controlled in accordance with the detected signal and accordingly, tracking control with high accuracy utilizing the near-field light can be carried out.

Further, according to a fourteenth aspect of the invention, there is provided an information reproducing apparatus for forming near-field light at an information recording medium and reproducing information by a reproducing probe for scattering the near-field light, characterized in comprising a first and a second light detecting means arranged symmetrically with each other relative to a front end portion of the reproducing probe along a reading direction for detecting fluxes of reflected and scattered light produced by scattering the near-field light by a front end portion of the reproducing probe and outputting detected signals, difference calculating means for calculating a difference between a first detected signal outputted from the first light detecting means and a second detected signal outputted from the second light detecting means and outputting a differential signal, reproducing probe position controlling means for controlling a position of the reproducing probe in accordance with the differential signal and reproduced signal forming means for forming a reproduced signal by calculating to add the first detected signal and the second detected signal.

According to the fourteenth aspect of the invention, the near-field light produced at the unit of the information of the information recording medium is scattered by the reproducing probe, fluxes of the reflected and scattered light are detected by the first and the second light detecting means arranged at at least two positions symmetrical with each other relative to the central axis of the very small aperture, the differential signal indicating the difference between the first detected signal detected and outputted by the first light detecting means and the second detected signal detected and outputted by the second light detecting means, is formed by the difference calculating means, position control of the reproducing probe in accordance with the differential signal can be carried out by the reproducing probe position controlling means and accordingly, tracking control with high accuracy utilizing the near-field light can be carried out. Further, the reproduced signal can be formed by carrying out operation of adding the first detected signal and the second detected signal by the reproduced signal forming means and accordingly, the information can simultaneously be reproduced.

Further, according to a fifteenth aspect of the invention, there is provided the information reproducing apparatus according to the thirteenth or the fourteenth aspect, characterized in that the reproducing probe is formed in a wedge-like shape.

According to the fifteenth aspect of the invention, the reproducing probe is formed in the wedge-like shape and accordingly, by reflecting the near-field light produced at the unit of the information of the information recording medium by the two inclined faces constituting the wedge-like shape, the directionalities can be given to fluxes of the reflected light and accordingly, the difference between the intensities of the fluxes of reflected light can be provided further significantly and tracking control with high accuracy utilizing the near-field light and having high reliability can be carried out. Further, sufficiently large intensity can be provided to the reproduced signal by the fluxes of reflected light.

BEST MODE FOR CARRYING OUT THE INVENTION

A detailed explanation will be given of embodiments of an information recording medium and an information reproducing apparatus according to the invention as follows.
(Embodiment 1)

Figure 1:
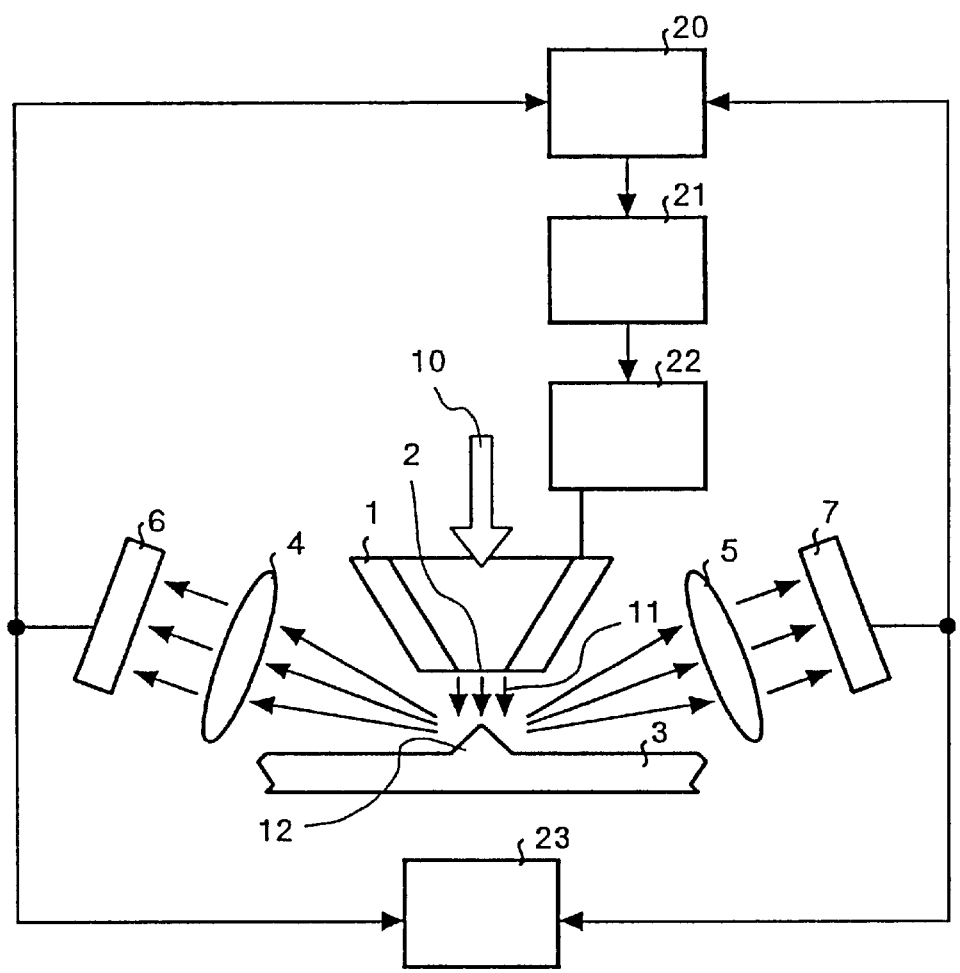
FIG. 1 is a block diagram showing an outline constitution of an information reproducing apparatus according to Embodiment 1.

FIG. 1 is a block diagram showing an outline constitution of an information reproducing apparatus according to Embodiment 1. In FIG. 1, the information reproducing apparatus according to Embodiment 1 is constituted by, a reproducing probe 1 for forming near-field light, an information recording medium 3 formed with data bits at high density, converging optical systems 4 and 5 for converging fluxes of reflected and scattered light scattered by the data bits of the information recording medium 3, reproduced light detectors 6 and 7 for receiving fluxes of light converged by the converging optical systems 4 and 5 and outputting electric signals, a difference circuit 20 for calculating a difference between the respective electric signals outputted from the reproduced light detectors 6 and 7, a tracking signal generator 21 for generating and outputting a tracking signal from the differential signal outputted from the difference circuit 20, an actuator 22 for controlling a position of the reproducing probe in accordance with the tracking signal outputted from the tracking signal generator 21 and an adding circuit 23 for forming a reproduced signal by adding the respective electric signals outputted from the reproduced light detectors 6 and 7.

The reproducing probe 1 is formed with a very small aperture 2 having a size equal to or smaller than a wavelength of laser beam 10 introduced from a laser beam source (not illustrated), for example, a diameter of several tens nanometers and near-field light 11 is formed at the very small aperture 2 by introducing the laser beam 10. As the reproducing probe 1, a probe used in a conventional near-field microscope can be utilized and is a probe enabling to form near-field light according to the above-described illumination mode, for example, an optical fiber probe comprising an optical fiber having a very small aperture at its front end and a surface coated by a metal, a cantilever-type optical probe having a very small aperture to which laser beam is guided via an optical waveguide at its front end, a plane probe comprising a plane substrate formed with a through hole in a shape of an inverse cone such that an apex thereof constitutes a very small aperture or the like.

The near-field light 11 formed at the vary small aperture 2 of the reproducing probe 1 is scattered by a data bit 12 of the convex shape formed on a substrate of the information recording medium 3 and scattered light constitutes propagating light (hereinafter, referred to as reflected and scattered light) and is introduced into the converging optical systems 4 and 5. In this case, the converging optical systems 4 and 5 each is constructed by a constitution of a converging lens or a collimating lens or the lens added with a light guide or an optical fiber and converge the reflected and scattered light to the reproduced light detectors 6 and 7 such that sufficiently detectably intensities are constituted. The reproduced light detectors 6 and 8 are, for example, photodiodes or photomultipliers.

The converging optical systems 4 and 5 and the reproduced light detectors 6 and 7 are arranged at fixed positions relative to the reproducing probe 1 and are positioned relative to the information recording medium 3 along with the reproducing probe 1 particularly by positioning control by the actuator 22. Therefore, it is preferable to constitute a light reproducing head integrated with the reproducing probe 1, the converging optical systems 4 and 5 and the reproduced light detectors 6 and 7 and the light reproducing head is subjected to positioning control by the actuator 22.

The information recording medium 3 is constructed by a structure in which a top portion of the data bit 12 for constituting an information unit formed by combining two inclined faces symmetrically and in a convex relative to a surface of the information recording medium 3, constitutes a central axis and the central axis coincides with a reading direction by the reproducing probe 1 (hereinafter, referred to as a tracking direction). That is, a section of the data bit 12 orthogonal to the reading direction is formed in a shape of a ridge in a triangular shape as shown by FIG. 1 and the apex of the triangular shape is disposed on the central axis of reading (central axis of tracking). By presence of the two symmetrical inclined faces, directionalities can be given to fluxes of the reflected and scattered light of the near-field light 11. Further, it is preferable for providing reflected and scattered light having a sufficient intensity to form a metal reflecting film on the surface of the information recording medium 3. Further, the reflection efficiency of the near-field light 11 can also be promoted by forming the information recording medium 3 per se by a metal.

Accordingly, by arranging a constitution comprising the converging optical system 4 and the reproduced light detector 6 and a constitution comprising the converging optical system 5 and the reproduced light detector 7 at positions symmetrical to each other relative to a central axis in parallel with a tracking direction of the very small aperture 2 of the reproducing probe 1 (hereinafter, referred to as reproducing probe central axis), fluxes of the reflected and scattered light reflected in directions symmetrical with each other by the two inclined faces provided at the data bit 12 can be detected.

Figure 2:
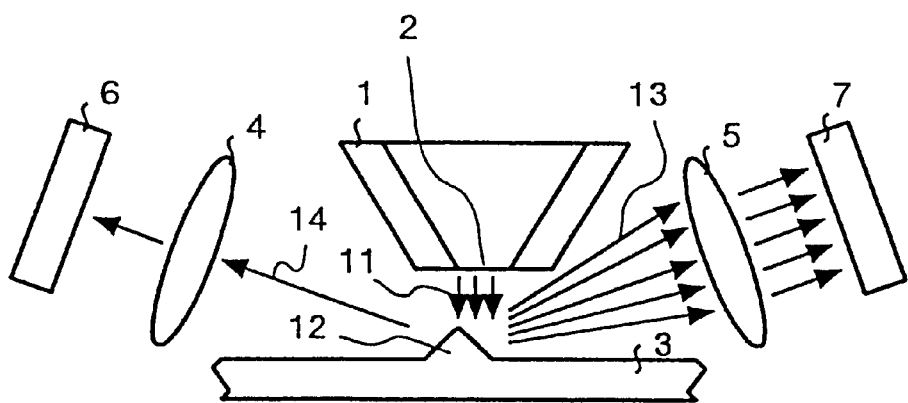
FIG. 2 is a view for explaining operation of the information reproducing apparatus according to Embodiment 1.

FIG. 2 is a view for explaining detection of reflected and scattered light when the reproducing probe 1 is arranged in a state in which the central axis of the reproducing probe and the tracking central axis are not coincident with each other. In FIG. 2, the reproducing probe 1 is disposed on the right side of the tracking central axis, that is, the top of the data bit 12 and fluxes of reflected and scattered light 13 and 14 are produced by interaction between the near-field light 11 formed at the very small aperture 2 under the state and the data bit 12.

In FIG. 2, the near-field light 11 is significantly scattered by the right inclined face of the data bit 12 and the reflected and scattered light 13 is guided in the right direction depending on an angle of inclination of the right inclined face. The reflected and scattered light 13 guided in the right direction is introduced into the converging optical system 5 and is inputted to the reproduced light detector 7.

Meanwhile, the near-field light 11 shows the largest intensity on the central axis of the reproducing probe and directly under the very small aperture 2 and accordingly, on the left inclined face of the data bit 12 disposed remote from the central axis of the reproducing probe, the intensity of the reflected and scattered light 14 provided by being scattered becomes weaker than that of the reflected and scattered light 13 on the side of the right inclined face. The reflected and scattered light 14 guided in the left direction is also introduced into the converging light optical system 4 and is inputted to the reproduced light detector 6.

Accordingly, in this case, the electric signal outputted at the reproduced light detector 7 is a signal larger than the electric signal outputted at the reproduced light detector 6. These electric signals are inputted to the difference circuit 20 and the differential signal is formed there as mentioned above. The magnitude of the differential signal indicates a degree of shift of the reproducing probe 1 from the tracking central axis and the differential signal is converted into the tracking signal by being inputted to the tracking signal generator 21. The tracking signal is a signal for driving the actuator 22 and the actuator 22 controls the position of the reproducing probe 1 in accordance with the tracking signal. For example, when the difference circuit 20 carries out an operation of subtracting the electric signal outputted from the reproduced light detector 7 from the electric signal outputted from the reproduced light detector 6, in a state shown by FIG. 2, the differential signal outputted from the difference circuit 20 shows a negative value. Successively, the tracking signal generator 21 interprets the negative differential signal as a signal for moving the actuator 22 to the left and outputs a tracking signal indicating the moving direction and a moving amount in accordance with the magnitude of the differential signal to the actuator 22. That is, the tracking signal generator 21 generates an actuator driving signal for correcting the shift between the reproducing probe 1 and the tracking central axis. The actuator 22 moves the reproducing probe 1 in accordance with the tracking signal outputted from the tracking signal generator 21 and makes the central axis of the reproducing probe and the tracking central axis coincide with each other. That is, tracking control in the left direction is carried out.

Further, although in FIG. 2, there is shown the case in which the reproducing probe 1 is disposed on the right side of the tracking central axis, when the reproducing probe 1 is disposed on the left side of the tracking central axis, an operation reverse to the above-described is carried out. That is, in that case, tracking control in the right direction is carried out.

Further, in parallel with the above-described tracking processing, the electric signal outputted at the reproduced light detector 7 and the electric signal outputted at the reproduced light detector 6 are inputted to the adding circuit 23 where the adding operation is carried out and are outputted as the reproduced signal. Thereby, presence or absence of the data bit 12 directly under the very small aperture 2 is detected.

Figure 3:
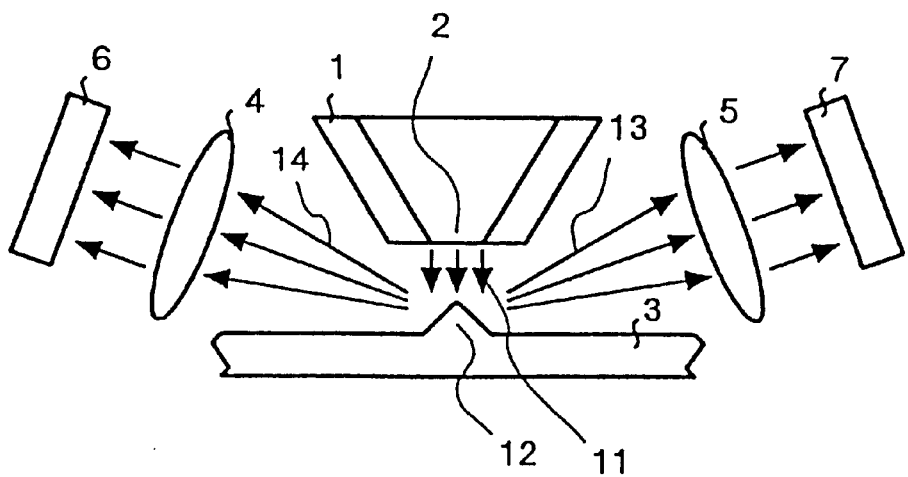
FIG. 3 is a view for explaining operation of the information reproducing apparatus according to Embodiment 1.

FIG. 3 is a view for explaining detection of reflected and scattered light when the reproducing probe 1 is arranged such that the central axis of the reproducing probe and the tracking central axis coincide with each other. In FIG. 3, the near-field light 11 formed at the very small aperture 2 produces fluxes of the reflected and scattered light 13 and 14 by uniform interaction of the right inclined face and the left inclined face of the data bit 12. That is, both of the fluxes of the reflected and scatted light 13 and 14 show substantially the same intensity and the electric signals respectively outputted at the reproduced light detector 7 and the reproduced light detector 6 also show substantially the same magnitude. Accordingly, no difference is produced at the difference circuit 20 and positioning control in the actuator 22 is not carried out. That is, FIG. 3 represents a final state after the above-described tracking control has been carried out.

Further, although according to Embodiment 1, explained above, there is constructed the structure in which the inclined faces are provided on the left and on the right of the tracking central axis by constituting the section of the data bit recorded to the information recording medium by the ridge in the triangular shape, for example, there may be constructed a structure in which the section of the data bit is constituted by a ridge in a semicircular shape and curved faces are provided on the left and on the right of the tracking central axis.

Further, data may be read by constituting the information recording medium in a disk-like shape as in CD and rotating the information recording medium at high speed or data may be read by forming the information recording medium as a flat plate without being limited to the disk-like shape and carrying out vector scanning by the reproducing probe.

As has been explained above, according to the information recording medium of Embodiment 1, the data bit constituting the information unit is constructed by a structure in the convex in which the inclined faces or the curved faces are provided symmetrically in the left and right direction relative to the central axis of the reading direction (tracking direction) and accordingly, the directionalities can be given to fluxes of the reflected and scattered light produced by scattering near-field light by the data bit. Further, according to the information reproducing apparatus of Embodiment 1, fluxes of the reflected and scattered light provided from the data bit of the above-described information recording medium can be detected in two symmetrical directions relative to the central axis of the reproducing probe and the tracking control of the reproducing probe can be carried out from the difference between the two detected signals. Further, the near-field light formed at the very small aperture of the reproducing probe is utilized as a signal for tracking control and accordingly, there is achieved tracking control at high accuracy accompanied by high positional resolution. Further, the constitution of the apparatus can be simplified since the optical systems used in detecting fluxes of the reproduced signal and detecting the tracking signal are not separated but are unified.

(Embodiment 2)

Figure 4:
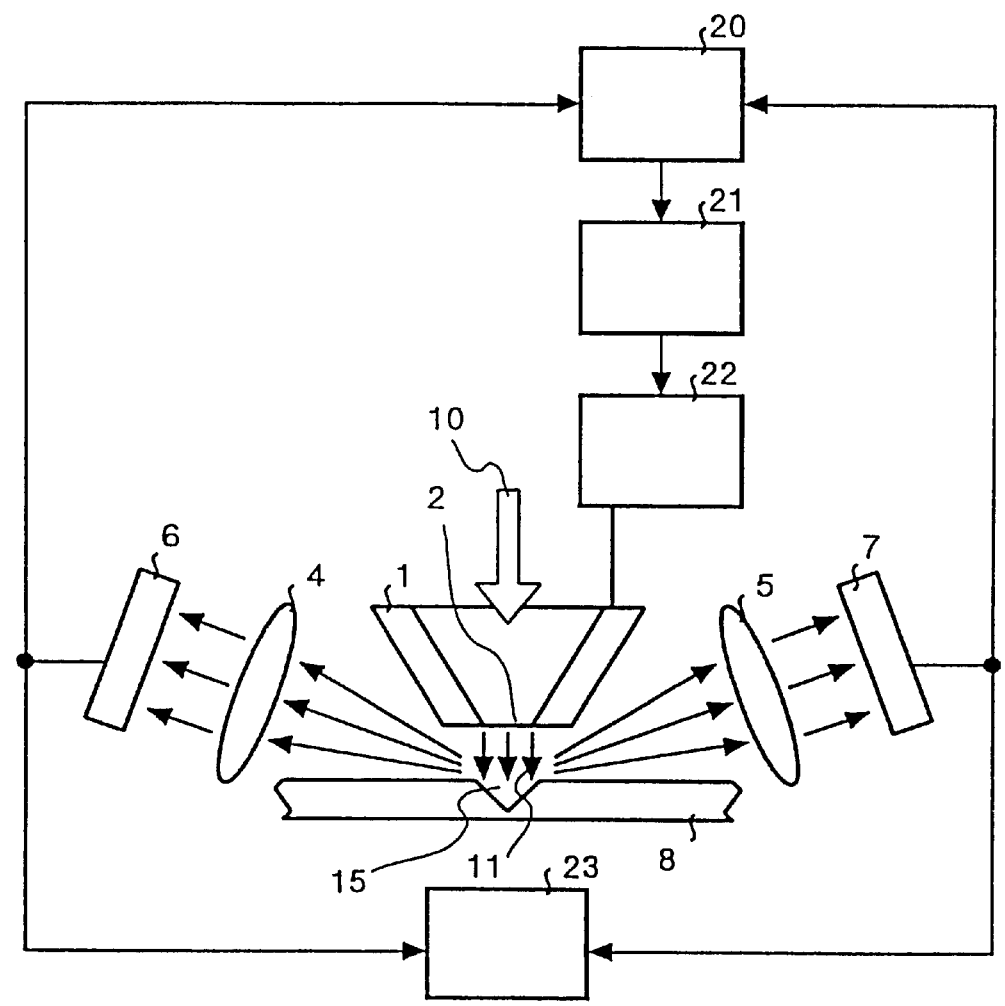
FIG. 4 is a block diagram showing an outline constitution of an information reproducing apparatus according to Embodiment 2.

FIG. 4 is a block diagram showing an outline constitution of an information reproducing apparatus according to Embodiment 2. In FIG. 4, the information reproducing apparatus according to Embodiment 2 is constituted by the reproducing probe 1 for forming near-field light, an information recording medium 8 formed with data bits at high density, the converging optical systems 4 and 5 for converging fluxes of reflected and scattered light scattered by the data bits of the information recording medium 8, the reproduced light detectors 6 and 7 for receiving fluxes of light converged by the converging optical systems 4 and 5 and outputting electric signals, the difference circuit 20 for calculating a difference between the respective electric signals outputted from the reproduced light detectors 6 and 7, the tracking signal generator 21 for generating and outputting a tracking signal from the differential signal outputted from the difference circuit 20, the actuator 22 for controlling a position of the reproducing probe in accordance with the tracking signal outputted from the tracking signal generator 21 and the adding circuit 23 for forming a reproduced signal by adding the respective electric signals outputted from the reproduced light detectors 6 and 7.

The reproducing probe 1 is formed with the very small aperture 2 having the size equal to or smaller than the wavelength of the laser beam 10 introduced from a laser beam source (not illustrated), for example, the diameter of several tens nanometers and the near-field light 11 is formed at the very small aperture 2 by introducing the laser beam 10. As has been explained in Embodiment 1, the reproducing probe 1 is a probe enabling to form near-field light by the above-described illumination mode such as an optical fiber probe, a cantilever-type optical probe, a plane probe or the like.

The near-field light 11 formed at the very small aperture 2 of the reproducing probe 1 is scattered by a data bit 15 of a concave formed on the information recording medium 8 and the scattered light constitutes propagating light (hereinafter, referred to as reflected and scattered light) and fluxes thereof are introduced into the converging optical systems 4 and 5. In this case, as has been explained in Embodiment 1, the converging optical systems 4 and 5 each is constructed by a constitution of, for example, a converging lens or a collimating lens or the like or the lens added with a light guide or an optical fiber and the reproduced light detectors 6 and 7 are, for example, photodiodes, photomultipliers or the like.

The converging optical systems 4 and 5 and the reproduced light detectors 6 and 7 are arranged at fixed positions relative to the reproducing probe 1 and are positioned relative to the information recording medium 8 along with the reproducing probe 1 particularly by positioning control by the actuator 22. Therefore, it is preferable to constitute a light reproducing head integrated with the reproducing probe 1, the converging optical systems 4 and 5 and the reproduced light detectors 6 and 7 and the light reproducing head is subjected to positioning control by the actuator 22.

The information recording medium 8 is constructed by a structure in which a top portion of the data bit 15 for constituting an information unit formed by combining two inclined faces symmetrically and in a concave relative to a surface of the information recording medium 8, constitutes a central axis and the central axis coincides with a reading direction by the reproducing probe 1 (hereinafter, referred to as a tracking direction). That is, a section of the data bit 15 orthogonal to the reading direction is formed in a shape of a groove in a triangular shape as shown by FIG. 4 and the apex of the triangular shape, that is, bottom point of the groove is disposed on the central axis of reading (central axis of tracking). By presence of the two symmetrical inclined faces, directionalities can be given to fluxes of the reflected and scattered light of the near-field light 11. Further, it is preferable for providing reflected and scattered light having a sufficient intensity to form a metal reflecting film on the surface of the information recording medium 8. Further, the reflection efficiency of the near-field light 11 can also be promoted by forming the information recording medium 8 per se by a metal.

Accordingly, by arranging a constitution comprising the converging optical system 4 and the reproduced light detector 6 and a constitution comprising the converging optical system 5 and the reproduced light detector 7 at positions symmetrical to each other relative to a central axis in parallel with a tracking direction of the very small aperture 2 of the reproducing probe 1 (hereinafter, referred to as reproducing probe central axis), fluxes of the reflected and scattered light reflected in directions symmetrical with each other by the two inclined faces provided at the data bit 15 can be detected.

Figure 5:
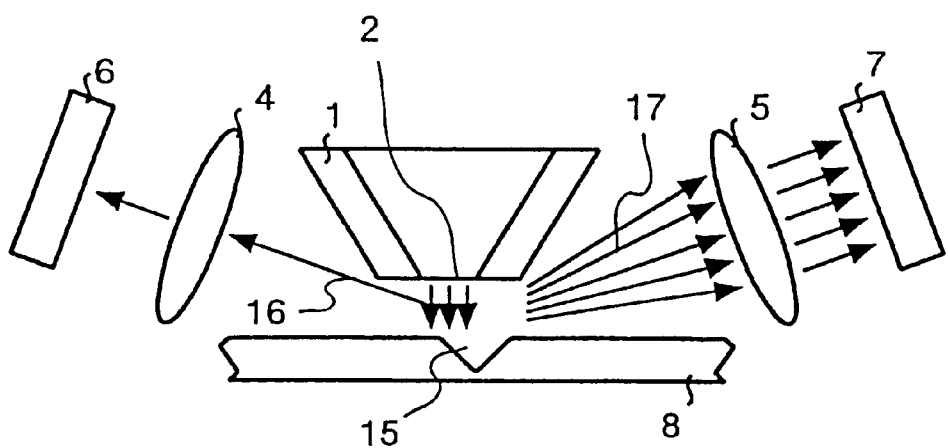
FIG. 5 is a view for explaining operation of the information reproducing apparatus according to Embodiment 2.

FIG. 5 is a view for explaining detection of reflected and scattered light when the reproducing probe 1 is arranged in a state in which the central axis of the reproducing probe and the tracking central axis are not coincident with each other. In FIG. 5, the reproducing probe 1 is disposed on the left side of the tracking central axis, that is, the bottom apex of the data bit 15 and fluxes of reflected and scattered light 16 and 17 are produced by interaction between the near-field light 11 formed at the very small aperture 2 under the state and the data bit 15.

In FIG. 5, the near-field light 11 is significantly scattered by the left inclined face of the data bit 15 and the reflected and scattered light 17 is guided in the left direction depending on an angle of inclination of the left inclined face. The reflected and scattered light 17 guided in the right direction is introduced into the converging optical system 5 and is inputted to the reproduced light detector 7.

Meanwhile, the near-field light 11 shows the largest intensity on the central axis of the reproducing probe and directly under the very small aperture 2 and accordingly, on the right inclined face of the data bit 15 disposed remote from the central axis of the reproducing probe, the intensity of the reflected and scattered light 16 provided by being scattered becomes weaker than that of the reflected and scattered light 17 on the side of the left inclined face. The reflected and scattered light 16 guided in the left direction is also introduced into the converging light optical system 4 and is inputted to the reproduced light detector 6.

Accordingly, in this case, the electric signal outputted at the reproduced light detector 7 is a signal larger than the electric signal outputted at the reproduced light detector 6. These electric signals are inputted to the difference circuit 20 and the differential signal is formed there as mentioned above. The magnitude of the differential signal indicates a degree of shift of the reproducing probe 1 from the tracking central axis and the differential signal is converted into the tracking signal by being inputted to the tracking signal generator 21. The tracking signal is a signal for driving the actuator 22 and the actuator 22 controls the position of the reproducing probe 1 in accordance with the tracking signal. For example, when the difference circuit 20 carries out an operation of subtracting the electric signal outputted from the reproduced light detector 7 from the electric signal outputted from the reproduced light detector 6, in a state shown by FIG. 5, the differential signal outputted from the difference circuit 20 shows a negative value. Successively, the tracking signal generator 21 interprets the negative differential signal as a signal for moving the actuator 22 to the right and outputs a tracking signal indicating the moving direction and a moving amount in accordance with the magnitude of the differential signal to the actuator 22. That is, the tracking signal generator 21 generates an actuator driving signal for correcting the shift between the reproducing probe 1 and the tracking central axis. The actuator 22 moves the reproducing probe 1 in accordance with the tracking signal outputted from the tracking signal generator 21 and makes the central axis of the reproducing probe and the tracking central axis coincide with each other. That is, tracking control in the right direction is carried out.

Further, although in FIG. 5, there is shown the case in which the reproducing probe 1 is disposed on the left side of the tracking central axis, when the reproducing probe 1 is disposed on the right side of the tracking central axis, an operation reverse to the above-described is carried out. That is, in that case, tracking control in the left direction is carried out.

Further, in parallel with the above-described tracking processing, the electric signal outputted at the reproduced light detector 7 and the electric signal outputted at the reproduced light detector 6 are inputted to the adding circuit 23 where the adding operation is carried out and are outputted as the reproduced signal. Thereby, presence or absence of the data bit 15 directly under the very small aperture 2 is detected.

Figure 6:
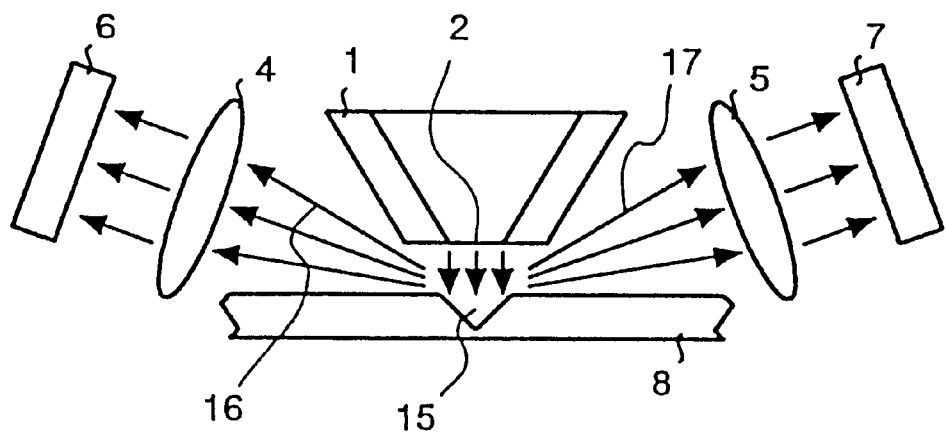
FIG. 6 is a view for explaining operation of the information reproducing apparatus according to Embodiment 2.

FIG. 6 is a view for explaining detection of reflected and scattered light when the reproducing probe 1 is arranged such that the central axis of the reproducing probe and the tracking central axis coincide with each other. In FIG. 6, the near-field light 11 formed at the very small aperture 2 produces fluxes of the reflected and scattered light 16 and 17 by uniform interaction of the right inclined face and the left inclined face of the data bit 15. That is, both of the fluxes of the reflected and scatted light 13 and 14 show substantially the same intensity and the electric signals respectively outputted at the reproduced light detector 7 and the reproduced light detector 6 also show substantially the same magnitude. Accordingly, no difference is produced at the difference circuit 20 and positioning control in the actuator 22 is not carried out. That is, FIG. 6 represents a final state after the above-described tracking control has been carried out.

Further, although according to Embodiment 2, explained above, there is constructed the structure in which the inclined faces are provided on the left and on the right of the tracking central axis by constituting the section of the data bit recorded to the information recording medium by the groove in the triangular shape, for example, there may be constructed a structure in which the section of the data bit is constituted by a groove in a semicircular shape and curved faces are provided on the left and on the right of the tracking central axis.

Further, data may be read by constituting the information recording medium in a disk-like shape as in CD and rotating the information recording medium at high speed or data may be read by forming the information recording medium as a flat plate without being limited to the disk-like shape and carrying out vector scanning on the reproducing probe.

As has been explained above, according to the information recording medium of Embodiment 2, the data bit constituting the information unit is constructed by a structure in the concave in which the inclined faces or the curved faces are provided symmetrically in the left and right direction relative to the central axis of the reading direction (tracking direction) and accordingly, the directionalities can be given to fluxes of the reflected and scattered light produced by scattering near-field light by the data bit. Further, according to the information reproducing apparatus of Embodiment 2, fluxes of the reflected and scattered light provided from the data bit of the above-described information recording medium can be detected in two symmetrical directions relative to the central axis of the reproducing probe and the tracking control of the reproducing probe can be carried out from the difference between the two detected signals. Further, the near-field light formed at the very small aperture of the reproducing probe is utilized as a signal for tracking control and accordingly, there is achieved tracking control at high accuracy accompanied by high positional resolution. Further, the constitution of the apparatus can be simplified since the optical systems used in detecting fluxes of the reproduced signal and detecting the tracking signal are not separated but are unified.

Figure 7:
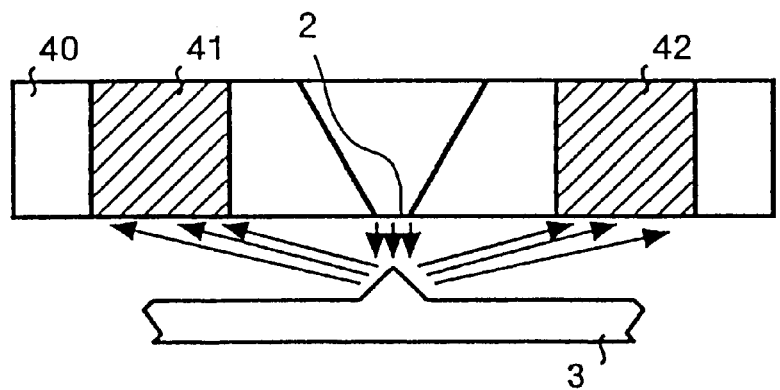
FIG. 7 is a view showing an example of a reproducing probe of the information reproducing apparatus according to Embodiments 1 and 2.

Further, a simple apparatus constitution which does not necessitate the converging optical systems 4 and 5 and the reproduced light detectors 6 and 7 can further be realized in the information reproducing apparatus according to Embodiments 1 and 2, explained above by particularly adopting a plane probe 40 of an integral type installed with reproduced light detectors 41 and 42 symmetrically on both sides of the very small aperture 2 as shown by FIG. 7, as the reproducing probe 1. The plane probe 40 can be fabricated by a silicon process used in conventional semiconductor fabrication technology and the reproduced light detectors 41 and 42 are, for example, photodiodes integrated on a silicon wafer. Further, there can also be constructed a constitution in which the reproduced light detectors 41 and 42 are integrated with optical waveguides. According to the plane probe 40, the reflected and scattered light which is scattered by the data bit 12 of the convex of the information recording medium 3 or by the data bit 15 of the concave of the information recording medium 8, mentioned above, with no particular need of fine adjustment of the positions of the reproduced light detectors.

Figure 8:
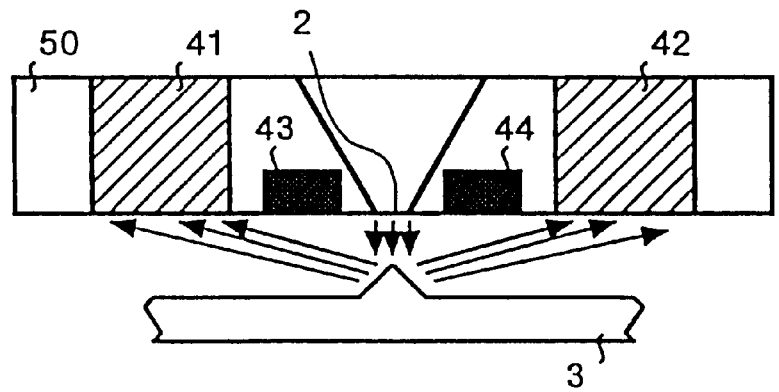
FIG. 8 is a view showing other example of a reproducing probe of the information reproducing apparatus according to Embodiments 1 and 2.

Further, by adopting a plane probe 50 installed with reproduced light detectors 43 and 44 for reproduced signals at vicinities of the very small aperture 2 of the plane probe 40 as shown by FIG. 8, as a reproducing probe, intensities of detecting reproduced signals can be complemented by detecting reflected and scattered light for tracking by the reproduced light detectors 41 and 42 and detecting fluxes of reflected and scattered light for the reproduced signals by the reproduced light detectors 41 and 42 and the reproduced light detectors 43 and 44.

(Embodiment 3)

Figure 9:
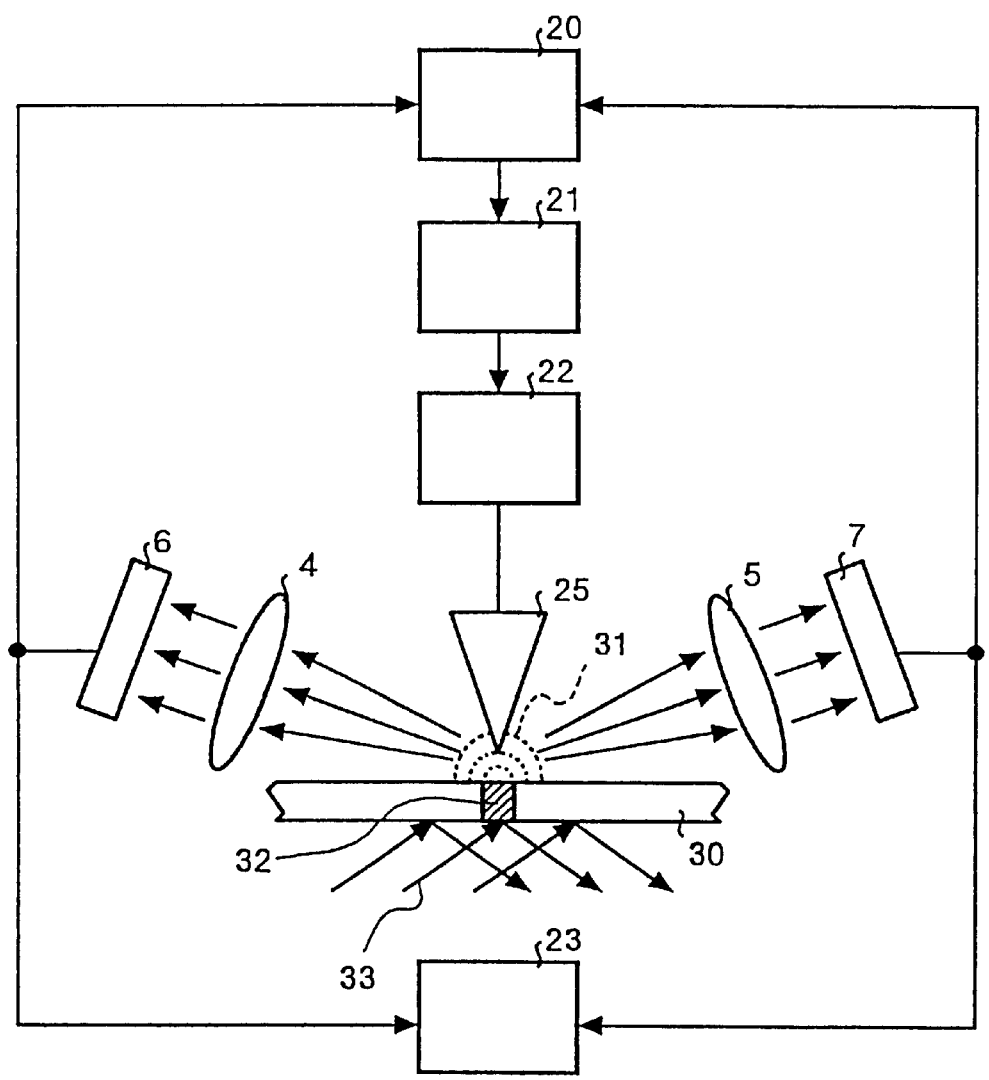
FIG. 9 is a block diagram showing an outline constitution of an information reproducing apparatus according to Embodiment 3.

FIG. 9 is a block diagram showing an outline constitution of an information reproducing apparatus according to Embodiment 3. In FIG. 9, the information reproducing apparatus according to Embodiment 3 is constituted by an information recording medium 30 formed with data bits at high density, a reproducing probe 25 for scattering near-field light formed at the data bits of the information recording medium 30, the converging optical systems 4 and 5 for converging fluxes of reflected and scattered light which are scattered by the reproducing probe 25, the reproduced light detectors 6 and 7 for receiving fluxes of light converged by the converging optical systems 4 and 5, the difference circuit 20 for calculating a difference between respective electric signals outputted from the reproduced light detectors 6 and 7 and outputting a differential signal, the tracking signal generator 21 for generating and outputting a tracking signal from the differential signal outputted from the difference circuit 20, the actuator 22 for controlling the position of the reproducing probe 25 in accordance with the tracking signal outputted from the tracking signal generator 21 and the adding circuit 23 for forming a reproduced signal by adding the respective electric signals outputted from the reproduced light detectors 6 and 7.

The information recording medium 30 comprises a light-transmitting material and is formed with a portion locally producing strong near-field light on its surface by laser beam 33 irradiated from a rear face thereof by a laser beam source (not illustrated) as a data bit 32 constituting an information unit. That is, the data bit 32 functions as a very small aperture for forming near-field light and near-field light according to the above-described collection mode can be utilized. Further, the date bit 32 is formed by, for example, piling up a metal thin film on a light-transmitting substrate and removing a portion of the metal thin film in correspondence with the data bit 32 or changing a refractive index of a portion of the light-transmitting substrate in correspondence with the data bit 32, from that of the surrounding. Further, presence or absence of the data bit 32 can also be detected by constituting the data bit 32 by a fluorescent material and arranging optical filters for cutting off the laser beam 33 and transmitting fluorescent light respectively between the converging optical system 4 and the reproduced light detector 6 and between the converging optical system 5 and the reproduced light detector 7.

Figure 10:
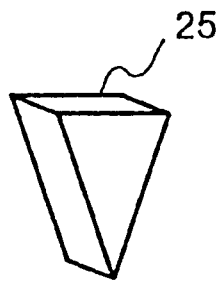
FIG. 10 is a view showing a reproducing probe of the information reproducing apparatus according to Embodiment 3.

The reproducing probe 25 is formed in a wedge-like shape as shown by FIG. 10 and can scatter near-field light at a front end portion thereof. Particularly, the data bit 32 can optimally be read by constituting a central axis by a top portion of the reproducing probe 25 which is formed by combining two symmetrical inclined faces constituting the wedge-like shape and making the central axis coincide with the reading direction by the reproducing probe 25 (hereinafter, referred to as tracking direction). That is, a section of the data bit 32 orthogonal to the direction of reading the data bit 32 is formed by a triangular shape as shown by FIG. 10 and the apex of the triangular shape is controlled to dispose on a reading central axis (tracking central axis). By the presence of the two symmetrical inclined faces, directionalities can be given to fluxes of the reflected and scattered light of the near-field light 31.

The near-field light 31 formed by the data bit 32 of the information recording medium 30 is scattered at the front end portion of the reproducing probe 25 and the scattered light constitutes propagating light (hereinafter, referred to as reflected and scattered light) and is introduced into the converging optical systems 4 and 5. In this case, the converging optical systems 4 and 5 each is constructed by a constitution of a converging lens or a collimating lens or the lens added with a light guide or an optical fiber and converge fluxes of the reflected and scattered light by the reproduced light detectors 6 and 7 such that sufficiently detectably intensities are constituted. The reproduced light detectors 6 and 7 are, for example, photodiodes or photomultipliers.

The converging optical systems 4 and 5 and the reproduced light detectors 6 and 7 are arranged at fixed positions relative to the reproducing probe 25 and are positioned relative to the information recording medium 3 along with the reproducing probe 25 particularly by positioning control by the actuator 22. Therefore, it is preferable to constitute a light reproducing head integrated with the reproducing probe 25, the converging optical systems 4 and 5 and the reproduced light detectors 6 and 7 and the light reproducing head is subjected to positioning control by the actuator 22.

Accordingly, by arranging a constitution comprising the converging optical system 4 and the reproduced light detector 6 and a constitution comprising the converging optical system 5 and the reproduced light detector 7 at positions symmetrical to each other relative to a central axis in parallel with a tracking direction of the front end of the reproducing probe 25 (hereinafter, referred to as reproducing probe central axis), fluxes of the reflected and scattered light reflected in directions symmetrical with each other by the two inclined faces provided at the reproducing probe 25 can be detected.

Figure 11:
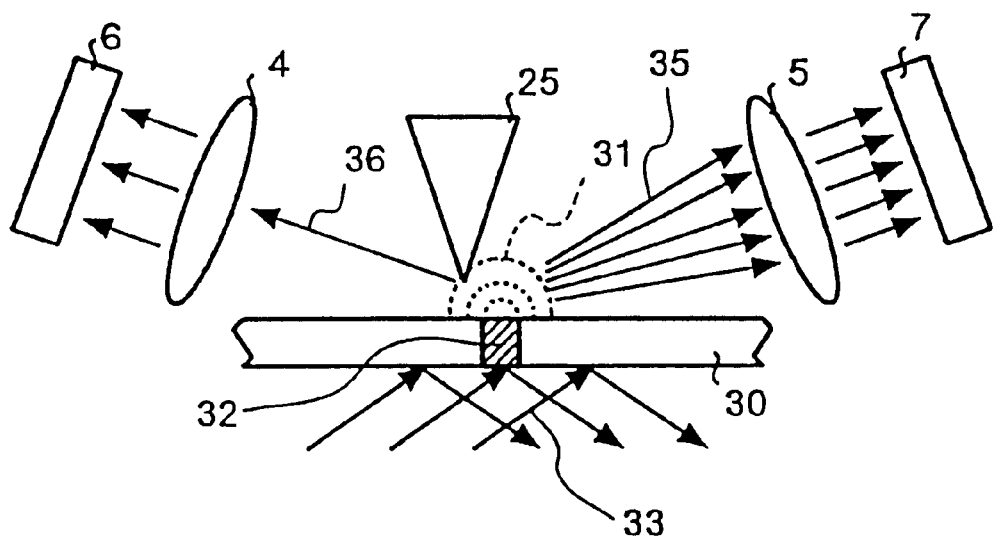
FIG. 11 is a view for explaining operation of the information reproducing apparatus according to Embodiment 3.

FIG. 11 is a view for explaining detection of reflected and scattered light in the case in which the reproducing probe 25 is arranged in a state in which the central axis of the reproducing probe and the tracking central axis are not coincident with each other. In FIG. 11, the reproducing probe 25 is disposed on the left side of the tracking central axis, that is, the central axis of the data bit 32 and fluxes of reflected and scattered light 35 and 36 are produced by interaction between the near-field light 31 formed at the data bit 32 under the state and the reproducing probe 25.

In FIG. 11, the near-field light 31 is significantly scattered by the right inclined face of the reproducing probe 25 and the reflected and scattered light 35 is guided in the right direction depending on an angle of inclination of the right inclined face. The reflected and scattered light 35 guided in the right direction is introduced into the converging optical system 5 and is inputted to the reproduced light detector 7.

Meanwhile, near-field light 31 shows the largest intensity on the central axis of the data bit 32 and accordingly, the intensity of the reflected and scattered light 36 provided by being scattered at the left inclined face of the reproducing probe 25 disposed remote from the central axis of the data bit 32, becomes weaker than that of the reflected and scattered light 35 on the side of the right inclined face. The reflected and scattered light 36 guided in the left direction is also introduced into the converging optical system 4 and is inputted to the reproduced light detector 6.

Accordingly, in this case, the electric signal outputted at the reproduced light detector 7 is a signal larger than the electric signal outputted at the reproduced light detector 6. These electric signals are inputted to the difference circuit 20 and the differential signal is formed there as mentioned above. The magnitude of the differential signal indicates a degree of shift of the reproducing probe 25 from the tracking central axis and the differential signal is converted into the tracking signal by being inputted to the tracking signal generator 21. The tracking signal is a signal for driving the actuator 22 and the actuator 22 controls the position of the reproducing probe 1 in accordance with the tracking signal. For example, when the difference circuit 20 carries out an operation of subtracting the electric signal outputted from the reproduced light detector 7 from the electric signal outputted from the reproduced light detector 6, in a state shown by FIG. 11, the differential signal outputted from the difference circuit 20 shows a negative value. Successively, the tracking signal generator 21 interprets the negative differential signal as a signal for moving the actuator 22 to the right and outputs a tracking signal indicating the moving direction and a moving amount in accordance with the magnitude of the differential signal to the actuator 22. That is, the tracking signal generator 21 generates an actuator driving signal for correcting the shift between the reproducing probe 25 and the tracking central axis. The actuator 22 moves the reproducing probe 25 in accordance with the tracking signal outputted from the tracking signal generator 21 and makes the central axis of the reproducing probe and the tracking central axis coincide with each other. That is, tracking control in the right direction is carried out.

Further, although in FIG. 11, there is shown the case in which the reproducing probe 25 is disposed on the left side of the tracking central axis, when the reproducing probe 25 is disposed on the right side of the tracking central axis, an operation reverse to the above-described is carried out. That is, in that case, tracking control in the left direction is carried out.

Further, in parallel with the above-described tracking processing, the electric signal outputted at the reproduced light detector 7 and the electric signal outputted at the reproduced light detector 6 are inputted to the adding circuit 23 where the adding operation is carried out and are outputted as the reproduced signal. Thereby, presence or absence of the data bit 32 directly under the very small aperture 2 is detected.

Figure 12:
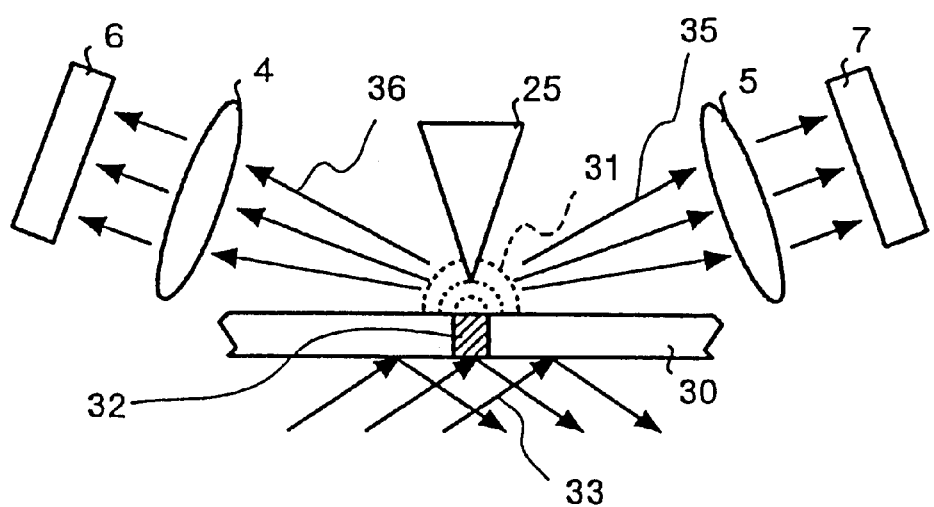
FIG. 12 is a view for explaining operation of the information reproducing apparatus according to Embodiment 3.

FIG. 12 is a view for explaining detection of reflected and scattered light when the reproducing probe 25 is arranged such that the central axis of the reproducing probe and the tracking central axis coincide with each other. In FIG. 12, the near-field light 31 formed at the data bit 32 produces fluxes of the reflected and scattered light 35 and 36 by uniform interaction of the right inclined face and the left inclined face of the data bit 32. That is, both of the fluxes of the reflected and scatted light 35 and 36 show substantially the same intensity and the electric signals respectively outputted at the reproduced light detector 7 and the reproduced light detector 6 also show substantially the same magnitude. Accordingly, no difference is produced at the difference circuit 20 and positioning control in the actuator 22 is not carried out. That is, FIG. 12 represents a final state after the above-described tracking control has been carried out.

Further, according to Embodiment 3, explained above, data may be read by constituting the information recording medium in a disk-like shape as in CD and rotating the information recording medium at high speed or data may be read by forming the information recording medium as a flat plate without being limited to the disk-like shape and carrying out vector scanning on the reproducing probe.

As has been explained above, according to the information reproducing apparatus of Embodiment 3, the near-field light formed at the data bit of the information recording medium is scattered by the reproducing probe in the wedge-like shape and fluxes of the reflected and scattered light provided thereby can be detected in two directions which are symmetrical relative to the central axis of the reproducing probe and tracking control of the reproducing probe can be carried out by the difference between the two detected signals. Further, the near-field light formed at the data bit of the information recording medium is utilized as a signal for tracking control and accordingly, there can be achieved the tracking control at high accuracy accompanied by high positional resolution. Further, the apparatus constitution can be simplified since the optical systems used in detecting fluxes of the reproduced signal and detecting the tracking signal are not separated but are unified.

INDUSTRIAL APPLICABILITY

As has been explained, according to the invention, the unit of information is constructed by the structure in which the inclined faces or the curved faces are provided symmetrically in the left and right direction with the reading direction as the central axis and accordingly, the directionalities can be given to the fluxes of reflected light reflected when the unit of information is irradiated with light and the difference between the intensities of the fluxes of reflected light can be utilized as a signal for tracking.

Further, according to the invention, the section of the unit of information orthogonal to the reading direction is formed in the triangular shape and accordingly, when the unit of information is irradiated with light, the light can efficiently be reflected at the inclined faces of the unit of information, further, the directionalities can be given to fluxes of the reflected light and accordingly, the difference between the intensities of the fluxes of reflected light can be utilized as a signal for tracking.

Further, according to the invention, the section of the unit of information orthogonal to the reading direction is formed in the semicircular shape and accordingly, when the unit of information is irradiated with light, the light can efficiently be reflected at the curved faces of the unit of information, further, the directionalities can be given to fluxes of the reflected light and accordingly, the difference between the intensities of the fluxes of reflected light can be utilized as a signal for tracking.

Further, according to the invention, the unit of information is constructed by the structure in which the unit of information is provided with the inclined faces or the curved faces symmetrically in the left and right direction with the reading direction as the central axis and is formed in the convex relative to the surface of the information recording medium and accordingly, when the unit of information is irradiated with light which is shifted to the left, the light can be reflected strongly in the left direction, when the unit of information is irradiated with light which is shifted to the right, the light can be reflected strongly to the right direction and accordingly, the difference between the intensities of fluxes of the reflected light can be utilized as a signal for tracking.

Further, according to the invention, the unit of information is constructed by the structure in which the unit of information is provided with the inclined faces or the curved faces symmetrically in the left and right direction with the reading direction as the central axis and is formed in the concave relative to the surface of the information recording medium and accordingly, when the unit of information is irradiated with light which is shifted, to the left side, the light can be reflected strongly in the right direction, when the unit of information is irradiated with light which is shifted to the right side, the light can be reflected strongly in the left direction and accordingly, the difference between the intensities of fluxes of the reflected light can be utilized as a signal for tracking.

Further, according to the invention, the metal reflecting film is formed on the surface of the information recording medium and accordingly, light irradiated to the unit of information can efficiently be reflected.

Further, according to the invention, by forming the information unit constructed by the structure in which the inclined faces or the curved faces are provided on the left and on the right with the reading direction as the central axis and with the central axis as the top portion, to the information recording medium and making the near-field light formed at the very small aperture of the reproducing probe incident on the unit of information, fluxes of the reflected and scattered light provided with the directionalities to the left and to the right can be formed, the fluxes of reflected and scattered light are detected at at least two positions symmetrical with each other relative to the central axis of the very small aperture and the position of the reproducing probe is controlled in accordance with the detected signal and accordingly, tracking control with high accuracy utilizing the near-field light can be carried out.

Further, according to the invention, by forming the information unit constructed by the structure in which the inclined faces or the curved faces are provided on the left and on the right with the reading direction as the central axis and with the central axis as the top portion, to the information recording medium and making the near-field light formed at the very small aperture of the reproducing probe incident on the information unit, there can be formed fluxes of the reflected and scattered light provided with the directionalities to the left and to the right, the fluxes of reflected and scattered light are detected by the first and the second light detecting means arranged at at least two positions symmetrical with each other relative to the central axis of the very small aperture, the differential signal indicating the difference between the first detected signal detected and outputted by the first light detecting means and the second detected signal detected and outputted by the second light detecting means, is formed by the difference calculating means, position control of the reproducing probe in accordance with the differential signal can be carried out by the reproducing probe position controlling means and accordingly, tracking control with high accuracy utilizing the near-field light can be carried out. Further, the reproduced signal can be formed by carrying out the operation of adding the first detected signal and the second detected signal by the reproduced signal forming means and accordingly, the information can simultaneously be reproduced.

Further, according to the invention, as the reproducing probe, there can be utilized the probe of the optical fiber type used in the conventional near-field microscope and accordingly, the accumulated technology of the near-field microscope can effectively be applied to the information reproducing apparatus.

Further, according to the invention, as the reproducing probe, there can be utilized the probe of the cantilever-type used in the conventional near-field microscope and accordingly, the accumulated technology of the near-field microscope can effectively be applied to the information reproducing apparatus.

Further, according to the invention, as the reproducing probe, there can be utilized the plane probe arranged with the first and the second light detecting means and accordingly, the simple apparatus constitution can be realized with no need of adjusting the positions of the first and the second light detecting means.

Further, according to the invention, as the reproducing probe, there can be utilized the plane probe arranged with the first and the second light detecting means and further with the third and the fourth light detecting means for detecting the fluxes of reflected and scattered light at vicinities of the very small aperture and accordingly, the reproduced signal having further sufficient intensity can be detected by the first and the second light detecting means and the third and the fourth light detecting means.

Further, according to the invention, the near-field light produced at the unit of information of the information recording medium is scattered by the reproducing probe, fluxes of the reflected and scattered light are detected at at least two positions symmetrical with each other relative to the front end portion of the reproducing probe, the position of the reproducing probe is controlled in accordance with the detected signal and accordingly, tracking control with high accuracy utilizing the near-field light can be carried out.

Further, according to the invention, the near-field light produced at the unit of information of the information recording medium is scattered by the reproducing probe, fluxes of the reflected and scattered light are detected by the first and the second light detecting means arranged at at least two position symmetrical with each other relative to the central axis of the very small aperture, the differential signal indicating the difference between the first detected signal detected and outputted by the first light detecting means and the second detected signal detected and outputted by the second light detecting means is formed by the difference calculating means, the position control of the reproducing probe in accordance with the differential signal can be carried out by the reproducing probe position controlling means and accordingly, tracking control with high accuracy utilizing the near-field light can be carried out. Further, the reproduced signal can be formed by carrying out the operation of adding the first detected signal and the second detected signal by the reproduced signal forming means and accordingly, the information can simultaneously be reproduced. Further, according to the invention, the reproducing probe is formed in the wedge-like shape and accordingly, by reflecting the near-field light produced at the unit of information of the information recording medium by the two inclined faces constituting the wedge-like shape, the directionalities can be given to fluxes of the reflected light and accordingly, the difference between the intensities of the fluxes of reflected light can be provided further significantly and tracking control with high accuracy having high reliability utilizing the near-field light can be carried out.

Further, the reproduced signal can be provided with sufficiently large intensity by the reflected light.

What is claimed is:

1. An information recording medium from which information is read by a reproducing probe having a very small aperture for forming near-field light on a surface of the recording medium, the information recording medium comprising: a substrate; and a plurality of units of information provided on the substrate, the units of information being non-fluorescent and uncharged, and comprising inclined or curved faces formed on the substrate and provided symmetrically in a left and right direction relative to a reading direction of the information, the left and right inclined or curved faces being directly joined to each other at a central axis without a flat face being interposed therebetween.

2. The information recording medium according to claim 1; wherein the units of information have a triangular cross-sectional shape in a direction orthogonal to the reading direction.

3. The information recording medium according to claim 1; wherein the units of information have a semicircular cross-sectional shape in a direction orthogonal to the reading direction.

4. The information recording medium according to claim 2 or 3; wherein the units of information have a convex shape relative to a surface of the substrate.

5. The information recording medium according to claim 2 or 3; wherein the units of information have a concave shape relative to a surface of the substrate.

6. The information recording medium according to claim 2 or 3; further comprising a reflective metal film formed on a surface of the substrate.

7. An information reproducing apparatus for reproducing information by a reproducing probe provided with a very small aperture for forming near-field light, characterized in comprising:
   an information recording medium in which a unit of the information is constructed by a structure in which inclined faces or curved faces are provided symmetrically in a left and right direction relative to a reading direction, and the left and the right inclined faces intersect with each other or the left and the right curved faces coincide with each other; and
   a control apparatus for detecting fluxes of reflected and scattered light produced by scattering the near-field light by the unit of the information at at least two positions symmetrical with each other relative to a central axis of the very small aperture along the reading direction and controlling a position of the reproducing probe in accordance with a detected signal.

8. An information reproducing apparatus for reproducing information by a reproducing probe provided with a very small aperture for forming near-field light, characterized in comprising:
   an information recording medium in which a unit of the information is constructed by a structure in which inclined faces or curved faces are provided symmetrically in a left and right direction relative to a reading direction and the left and the right inclined faces intersect with each other or the left and the right curved faces coincide with each other; and
   a first and a second light detecting means arranged symmetrically with each other in the left and right direction relative to a central axis of the very small aperture along the reading direction for detecting fluxes of reflected and scattered light produced by scattering the near-field light by the unit of the information and outputting detected signals;

difference calculating means for calculating a difference between a first detected signal outputted from the first light detecting means and a second detected signal outputted from the second light detecting means and outputting a differential signal;

reproducing probe position controlling means for controlling a position of the reproducing probe in accordance with the differential signal; and reproduced signal forming means for calculating to add the first detected signal and the second detected signal and forming a reproduced signal.

9. The information recording apparatus according to claim 7 or 8, characterized in that the reproducing probe comprises an optical fiber provided with the very small aperture at a front end thereof.

10. The information reproducing apparatus according to claim 7 or 8, characterized in that the reproducing probe is a probe of a cantilever type provided with the very small aperture at a projected portion thereof.

11. The information recording apparatus according to claim 7 or 8, characterized in that the reproducing probe is a plane probe comprising a plane substrate formed by being penetrated with a hole in a shape of an inverse cone to constitute the very small aperture by a top portion thereof and the first and the second light detecting means are arranged at the plane substrate.

12. The information reproducing apparatus according to claim 11, characterized in that the reproducing probe is the plane probe arranged with a third and a fourth light detecting means for detecting the fluxes of the reflected and scattered light at vicinities of the very small aperture.

13. An information reproducing apparatus comprising: a reproducing probe for forming near-field light at an information recording medium having a plurality of units of information formed thereon, the information being reproduced by scattering of the near-field light by the units of information; light detecting means for detecting fluxes of reflected and scattered light produced by scattering of the near-field light by the units of information formed on the information recording medium at at least two positions symmetrical with each other relative to a front end portion of the reproducing probe; and means for controlling a position of the reproducing probe in accordance with the detected light fluxes.

14. An information reproducing apparatus for forming near-field light at an information recording medium and reproducing information by a reproducing probe for scattering the near-field light, characterized in comprising:

a first and a second light detecting means arranged symmetrically with each other relative to a front end portion of the reproducing probe along a reading direction for detecting fluxes of reflected and scattered light produced by scattering the near-field light by a front end portion of the reproducing probe and outputting detected signals;

difference calculating means for calculating a difference between a first detected signal outputted from the first light detecting means and a second detected signal outputted from the second light detecting means and outputting a differential signal;

reproducing probe position controlling means for controlling a position of the reproducing probe in accordance with the differential signal; and reproduced signal forming means for forming a reproduced signal by calculating to add the first detected signal and the second detected signal.

15. The information reproducing apparatus according to claim 13 or 14, characterized in that the reproducing probe is formed in a wedge-like shape.

* * * * *